(12) United States Patent
Neuman et al.

(10) Patent No.: US 7,590,503 B2
(45) Date of Patent: Sep. 15, 2009

(54) METHOD AND SYSTEM FOR REROUTEABLE CYCLIC REDUNDANCY CHECK SUM (CRC) FOR DIFFERENT SOURCES

(75) Inventors: Darren Neuman, Palo Alto, CA (US); Chengfuh Jeffrey Tang, Saratoga, CA (US); Yao-Hua Steven Tseng, Fremont, CA (US); Guang Ting Shih, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/646,719

(22) Filed: Aug. 25, 2003

(65) Prior Publication Data

US 2005/0038622 A1 Feb. 17, 2005

Related U.S. Application Data

(60) Provisional application No. 60/495,125, filed on Aug. 15, 2003.

(51) Int. Cl.
*H04L 12/26* (2006.01)

(52) U.S. Cl. .......................... 702/117; 702/58; 702/185; 370/244; 370/248; 370/251

(58) Field of Classification Search .................... 702/57, 702/58, 81, 82, 108, 117, 118, 120, 122, 702/123, 182–185; 324/500, 537, 538, 555; 348/180, 192, 189; 370/241, 244, 248, 250, 370/251, 242, 249; 375/224, 225, 213; 714/752, 714/758, 746
See application file for complete search history.

(56) References Cited

U.S. PATENT DOCUMENTS

| 3,928,730 | A | * | 12/1975 | Aagaard et al. | ............ 340/2.21 |
| 4,328,577 | A | * | 5/1982 | Abbott et al. | ............... 370/228 |
| 5,787,463 | A | * | 7/1998 | Gajjar | ........................ 711/114 |
| 2001/0013104 | A1 | * | 8/2001 | Mann et al. | ..................... 714/6 |

OTHER PUBLICATIONS

Sebaa, Lahouari et al."Self-Testable Video Controllers", Sep. 27-29, 1994, WESCON/94. 'Idea/Microelectronics'. Conference, pp. 542-546.*

* cited by examiner

*Primary Examiner*—Manuel L Barbee
(74) *Attorney, Agent, or Firm*—Sterne, Kessler, Goldstein & Fox PLLC

(57) ABSTRACT

Provided is a system and method including a number of routers structured and arranged to route one or more video sources to any of one or more destinations. Each of the number of routers including a plurality of input and output ports and each input port being connectable to any one or more of corresponding output ports via data-paths. The datapaths are connectable to a corresponding one of the one or more destinations. The apparatus includes a testing output port selectably connectable to any of the one or more output data-paths. The testing output port is configured to connect a selected one of the one or more data-paths to a data collection device. The testing output port is configured to facilitate analysis of at least one from the group including (a) one or more of the data paths and (b) one or more of the video sources associated with the selected data-path.

9 Claims, 3 Drawing Sheets

METHOD AND SYSTEM FOR REROUTEABLE CYCLIC REDUNDANCY CHECK SUM (CRC) FOR DIFFERENT SOURCES

CROSS-REFERENCE TO RELATED APPLICATIONS

This application claims the benefit of U.S. Provisional Application No. 60/495,125, filed Aug. 15, 2003, which is incorporated herein by reference.

BACKGROUND OF THE INVENTION

1. Field of the Invention

The present invention generally relates to performing CRC analysis in integrated circuit (IC) test environments.

2. Related Art

CRC check sum checking is a very useful tool for analyzing the integrity of video data associated with modern video networking systems. Within video test environments, CRC modules are provided along video data paths to collect incoming video pixel data in support of CRC check sum analysis. During IC chip design, for example, aggregation can be accomplished and then compared with the associated CRC check sums. CRC analysis can also be used for bench testing after the IC chips have completed the design phase. CRC check sum analysis can also be used prior to software release, for example, during software regression testing to insure the validity of transmitted data fields.

Many separate CRC modules are required to accommodate conventional CRC analysis of video data fields. For example, a separate CRC module is required for each internal data path and each associated video component within a system under test. Including numerous CRC modules to support testing can be costly and can consume significant amounts of an IC chip's surface area.

Therefore, what is needed is a mechanism to facilitate the use of a CRC module for performing CRC analysis in video networking systems having multiple paths and multiple components.

BRIEF SUMMARY OF THE INVENTION

Consistent with the principles of the present invention as embodied and broadly described herein, an embodiment of the present invention includes an apparatus for testing data paths and/or video sources on an integrated circuit. The apparatus includes a number of switches configured to switch one or more video sources to one or more destinations, each of the number of switches including a plurality of input and output ports. Each input port is connectable to one or more of the output ports via data-paths.

A testing output port is selectably connected to one or more of the data-paths and a controller is coupled to at least one of the switches and configured for selectably connecting the testing output port. The testing output port is configured to (i) connect a selected one of the data-paths to a data collection device and (ii) permit analysis of at least one from the group including (a) one or more of the data paths and (b) one or more of the video sources, via the selected data-path.

Further features and advantages of the present invention, as well as the structure and operation of various embodiments of the present invention are described in detail below with reference to the accompanying drawings.

BRIEF DESCRIPTION OF THE DRAWINGS AND FIGURES

The accompanying drawings, which are incorporated in and constitute part of the specification, illustrate embodiments of the invention and, together with the general description given above and detailed description given below, serve to explain the principles of the invention. In the drawings.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the impending claims.

It would be apparent to one skilled in the art that the present invention, as described below, may be implemented in many different embodiments of hardware, software, firmware, and/or the entities illustrated in the figures. The actual software code with the specialized control hardware to implement the present invention is not limiting of the present invention. Thus, the operation and behavior of the present invention will be described with the understanding that modifications and variations of the embodiments are possible, given the level of detail presented herein.

Figure 1:
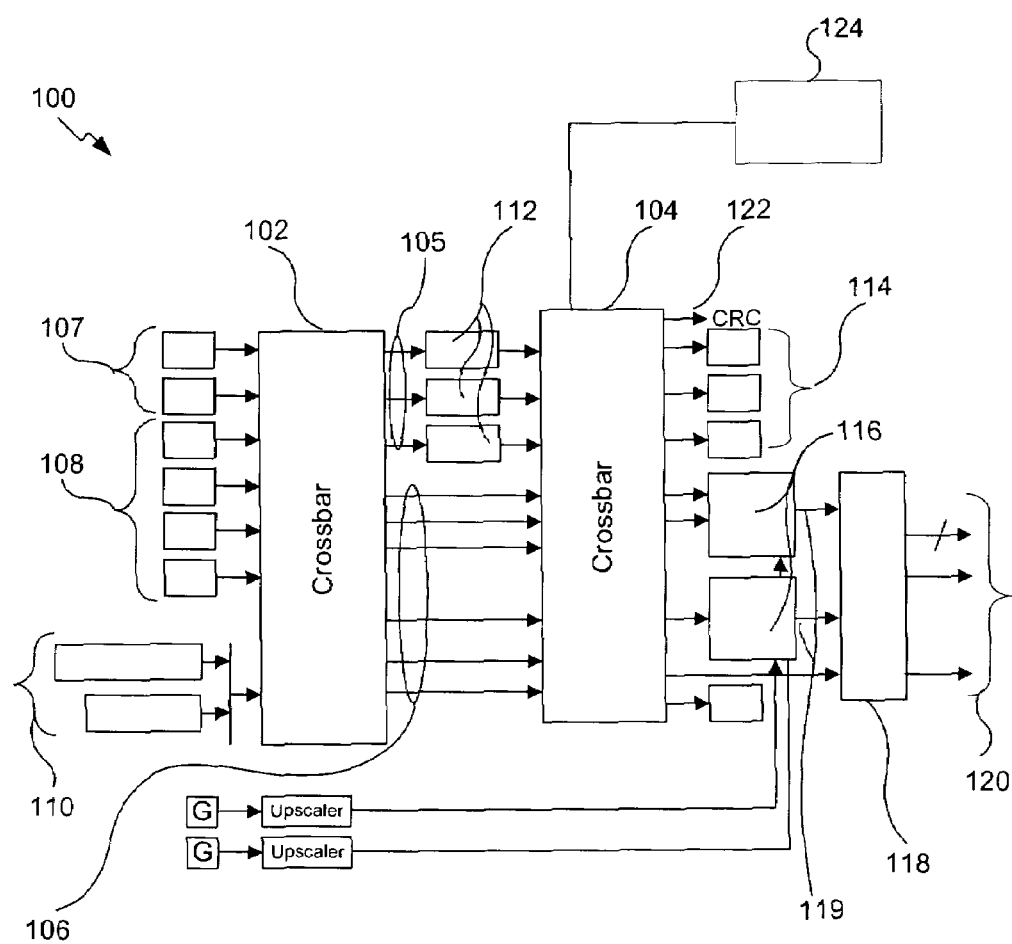
FIG. 1 is a block diagram illustration of an apparatus structured and arranged in accordance with an embodiment of the present invention.

FIG. 1 is an illustration of an exemplary video network device 100 constructed and arranged in accordance with an embodiment of the present invention. In FIG. 1, the video network device 100 includes switching devices 102 and 104. The switching devices 102 and 104 can include, for example, cross-bar switches, video routers, multiplexers, or other similar hardware. The switching devices 102 and 104 route one or more input video sources to one or more output destinations. The switching devices 102 and 104 are interconnected through data lines 105 and 106.

For purposes of illustration, the video networking device 102 is connected to input video sources 107, 108, and 110. The video sources 107 can include, for example, moving picture experts group (MPEG) feeders. The video sources 108 can include, for example, video feeders. Video sources 110 can include analog video input source devices.

Video source devices 112, such as 3D scalers, are provided for processing video data transferred between the video switching devices 102 and 104.

The video switching device 104 is shown connected to output devices 114 and 116, which can include video capture engines. The output devices 116 can include, for example, video compositors which can be used for image editing applications. An exemplary video encoder 118 is connected to outputs to the compositors 116 via connecting lines 119 for providing encoded video data to output source devices 120, such as televisions. The video switching devices 102 and 104 are implemented to route one or more of the video sources 107, 108, and 110 such as video playback, digital video or analog video, to one or more of output destinations 114, 116, and/or 120.

A dynamically configurable output path 122 is included as an output data path from the networking device 104. The output data path 122 can in-turn be connected to a CRC module, or data collection device. In the exemplary embodiment of FIG. 1, the output path 122 is configured as a dedicated CRC output data path. The output data path 122 can be programmed to monitor any of the video sources 107, 108, and 110 and any of the destination devices 114, 116, and 120 without interrupting normal operations.

A CRC module (not illustrated in FIG. 1) connected to the CRC output data path 122 can facilitate CRC checksum checking of pixels transmitted along one or more data paths internal to either of the switches 102 and 104, as well as the paths 105 and 106. The CRC output data path 122 also facilitates CRC checksum testing of any of the internal states of components coupled to either of the switches 102 and 104 and/or along the paths 105 and 106.

CRC modules can be programmed to capture CRC data, such as pixel value check sums, for check sum data analysis. In the present invention, as noted above, the CRC output data path 122 can be programmed for connection to any input source device (e.g 107, 108, and/or 110) or one or more internal data paths associated with the video network devices 102 and 104. A controller 124 is coupled to the video network device 104 and configured for controlling the output data path 122. A more detailed illustration of the exemplary network device 104 and the CRC output data path 122 are illustrated in FIG. 2.

Figure 2:
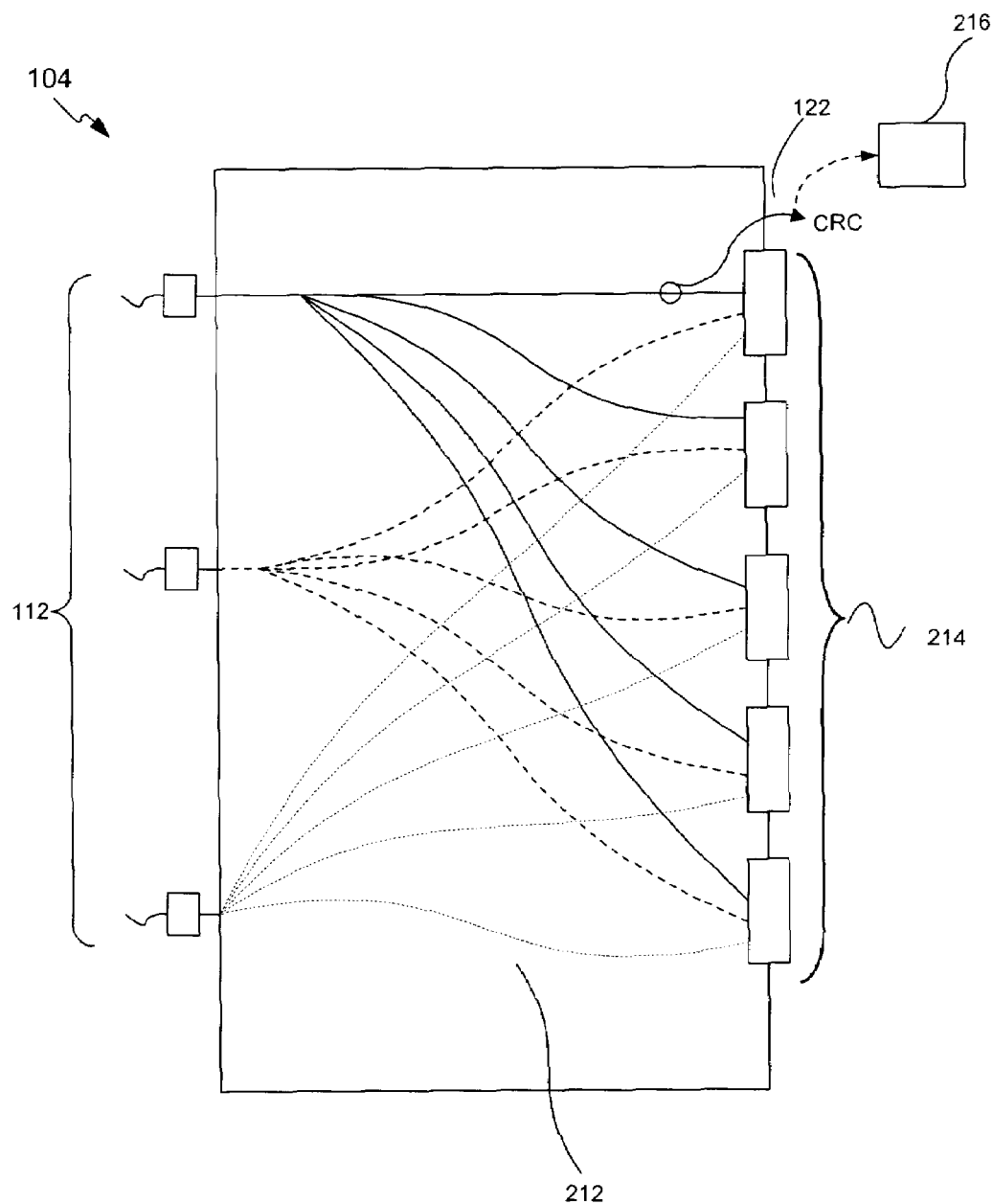
FIG. 2 is a block diagram illustration of an exemplary video network used in the illustration of FIG. 2.

FIG. 2, the switching device 104, for illustrative purposes, is shown to include the exemplary video source devices 112. The video source devices 112 are connected via internal data paths 212, within the switching device 104, to output data ports 214. The output data ports 214 can be connected, for example, to the destination devices 114 and 116.

Using turn-key hardware handshake techniques, such as the Broadcom corporation's Ready Accept™ protocol, the CRC output data path 122 can be connected across any of the internal data paths 212 or the video source devices 112. Alternatively, the CRC output data path 122 can be configured to allow monitoring any of the output data ports 214 by, for example, a CRC module 216.

In this manner, one hardware CRC module can be connected to the output data path 122 and used to perform CRC check sum of any input video pixel. This technique provides CRC checking flexibility for application to one or more internal data paths through programming of the video switching device 104 and/or the switching device 102. Thus, a user can apply CRC checking to one or more operational modes without impact to normal operation of the video network device 100.

Figure 3:
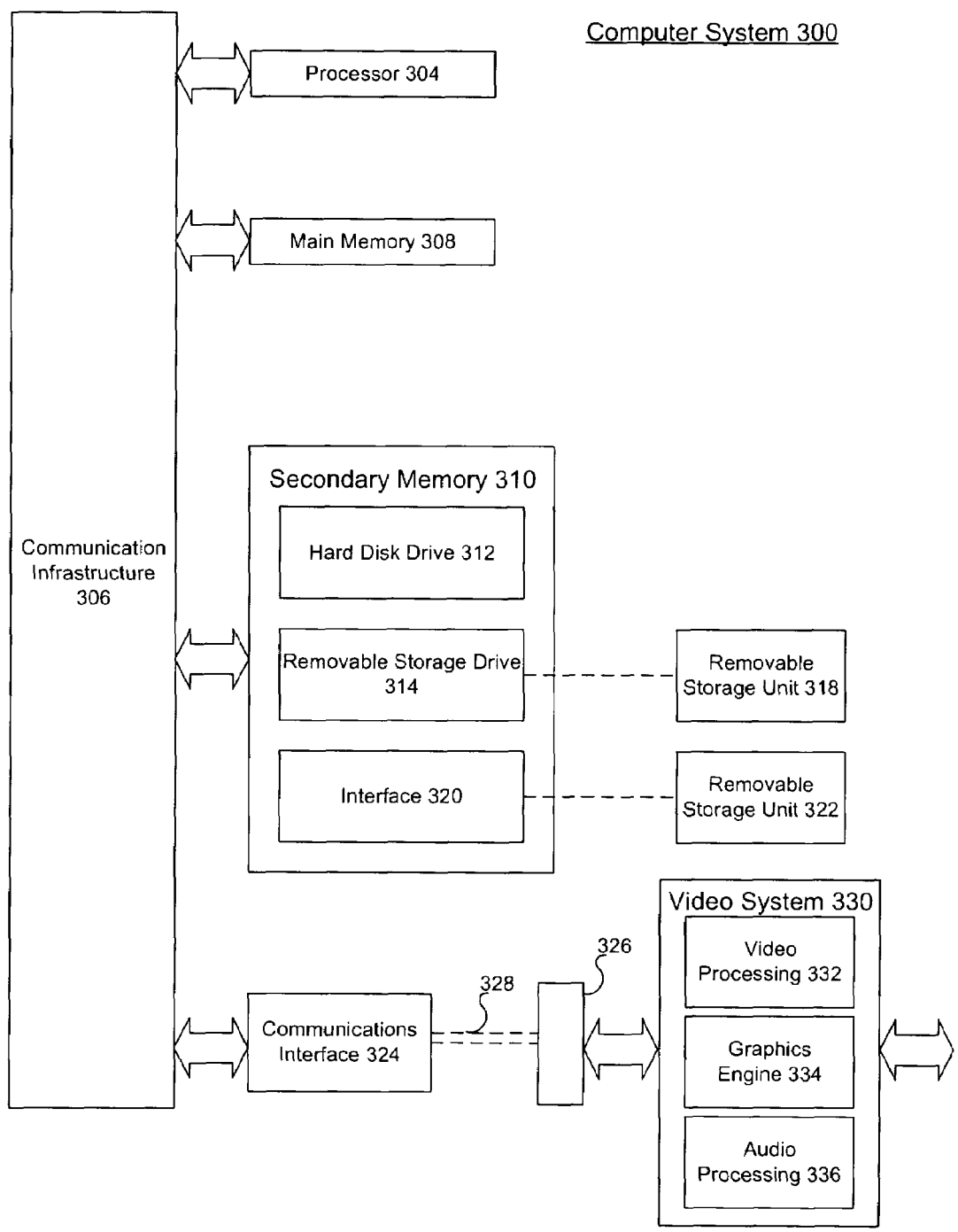
FIG. 3 is a block diagram of an exemplary computer system on which the present invention can be practiced.

As stated above, the present invention can be implemented in hardware, or as a combination of software and hardware. Consequently, the invention may be implemented in the environment of a computer system or other processing system. An example of such a computer system 300 is shown in FIG. 3.

The computer system 300 includes one or more processors, such as a processor 304. The processor 304 can be a special purpose or a general purpose digital signal processor. The processor 304 is connected to a communication infrastructure 306 (for example, a bus or network). Various software implementations are described in terms of this exemplary computer system. After reading this description, it will become apparent to a person skilled in the relevant art how to implement the invention using other computer systems and/or computer architectures.

The computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. The removable storage unit 318, represents a floppy disk, magnetic tape, optical disk, etc. which is read by and written to by removable storage drive 314. As will be appreciated, the removable storage unit 318 includes a computer usable storage medium having stored therein computer software and/or data.

In alternative implementations, the secondary memory 310 may include other similar means for allowing computer programs or other instructions to be loaded into the computer system 300. Such means may include, for example, a removable storage unit 322 and an interface 320. Examples of such means may include a program cartridge and cartridge interface (such as that found in video game devices), a removable memory chip (such as an EPROM, or PROM) and associated socket, and the other removable storage units 322 and the interfaces 320 which allow software and data to be transferred from the removable storage unit 322 to the computer system 300.

The computer system 300 may also include a communications interface 324. The communications interface 324 allows software and data to be transferred between the computer system 300 and external devices. Examples of the communications interface 324 may include a modem, a network interface (such as an Ethernet card), a communications port, a PCMCIA slot and card, etc. Software and data transferred via the communications interface 324 are in the form of signals 328 which may be electronic, electromagnetic, optical or other signals capable of being received by the communications interface 324. These signals 328 are provided to the communications interface 324 via a communications path 326. The communications path 326 carries the signals 328 and may be implemented using wire or cable, fiber optics, a phone line, a cellular phone link, an RF link and other communications channels.

The communications path 326 can couple the communications interface 324 to an exemplary video system 330. By way of example, the video system 330 can include a video processing module 332, a graphics engine 334, and an audio processing module 336.

In the present application, the terms "computer readable medium" and "computer usable medium" are used to generally refer to media such as the removable storage drive 314, a hard disk installed in the hard disk drive 312, and the signals 328. These computer program products are means for providing software to the computer system 300.

Computer programs (also called computer control logic) are stored in the main memory 308 and/or the secondary memory 310. Computer programs may also be received via the communications interface 324. Such computer programs, when executed, enable the computer system 300 to implement the present invention as discussed herein.

In particular, the computer programs, when executed, enable the processor 304 to implement the processes of the present invention. Accordingly, such computer programs represent controllers of the computer system 300. By way of example, in the embodiments of the invention, the processes/methods performed by signal processing blocks of encoders and/or decoders can be performed by computer control logic. Where the invention is implemented using software, the software may be stored in a computer program product and loaded into the computer system 300 using the removable storage drive 314, the hard drive 312 or the communications interface 324.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by analog and/or digital circuits, discrete components, application specific integrated circuits, firmware, processor executing appropriate software and the like or any combination thereof. Thus, the breadth and scope of the present invention should not be limited by any of the above described exemplary embodiments but should be defined only in accordance with the following claims and their equivalence.

What is claimed is:

1. An apparatus for testing data paths and/or video sources on an integrated circuit, comprising:
a switching device configured to couple one or more video sources to one or more destinations, the switching device including a plurality of input and output ports, each input port being connectable to one of (i) a single one of the output ports, (ii) a plurality of the output ports simultaneously, and (iii) all of the output ports simultaneously, via primary data-paths, the switching device including only one testing output data path dynamically configurable to couple to only one of the primary data-paths;
wherein the one testing output data-path is dedicated to cyclic redundancy checksum (CRC) output data; and
wherein a CRC module is configured to receive video testing output data directly from the one testing output data-path and perform CRC testing of the video testing output data without interrupting simultaneous provision of the one or more video sources to the one or more destinations; and
a controller connectable to the switching device via the one testing output data path to (i) connect the only one primary data path to a data collection device and (ii) permit analysis of at least one from the group including (a) one or more of the primary data paths and (b) one or more of the video sources, via the connected only one primary data-path;
wherein the permitted analysis is based only on data received at the testing output data-path through the only one primary data path.

2. The apparatus of claim 1, wherein the switching device includes video cross-bar devices.

3. The apparatus of claim 1, wherein the analysis includes CRC checksum checking.

4. The apparatus of claim 1, wherein data collection device is a CRC module.

5. An apparatus comprising:
a first switching device having a plurality of first input and output ports coupled together via first internal paths, each first input port being connectable to one of (i) a single one of the first output ports, (ii) a plurality of the first output ports simultaneously, and (iii) all of the first output ports simultaneously;
at least a second switching device including an input side having a plurality of second input ports and an output side having a plurality of second output ports, the second input and output ports being coupled together via second data paths, the first output ports being connected to corresponding ones of the second input ports, the second switching device including one testing output data path;
wherein the one testing output data path is dynamically configurable to permit monitoring of only one from the group including (i) only a selected one of the first input and output ports, (ii) only a selected one of the first data paths, (iii) only a selected one of the second input and output ports, and (iv) only a selected one of the second data paths;
wherein the one testing output data-path is dedicated to cyclic redundancy checksum (CRC) output data; and
wherein a CRC module is configured to receive testing output data directly from the one testing output data-path and perform CRC testing of the video testing output data without interrupting simultaneous provision of the one or more video sources to the one or more destinations; and
a controller connectable to the second switching device via the one testing output data path to (i) connect the only one first or second data path or a selected pair of a first data path and a second data path to a data collection device and (ii) permit analysis of at least one from the group including (a) one or more of the data paths and (b) one or more of the video sources, via the connected only one data;
wherein the permitted analysis is based only on data received at the one testing output data path through the only one of the selected (i) first input and output ports, (ii) first data path, (iii) second input and output ports, and (iv) second data paths.

6. The apparatus of claim 5, further comprising a data collection device configured for coupling to the one testing output data path.

7. The apparatus of claim 6, wherein the data collection device is a cyclic redundancy check (CRC) module.

8. The apparatus of claim 7, wherein the monitoring includes CRC checksum checking of internal states of devices coupled to one or more of the first and second input and output ports.

9. The apparatus of claim 8, further comprising one or more scaling devices connected between selected ones of the first output ports and the second input ports, wherein the testing output port facilitates CRC checksum checking of the one or more scaling devices.

* * * * *